United States Patent
Patel et al.

(10) Patent No.: US 11,205,179 B1
(45) Date of Patent: Dec. 21, 2021

(54) SYSTEM, METHOD, AND PROGRAM PRODUCT FOR RECOGNIZING AND REJECTING FRAUDULENT PURCHASE ATTEMPTS IN E-COMMERCE

(71) Applicant: Overstock.com, Inc., Midvale, UT (US)

(72) Inventors: Ashish A. Patel, Riverton, UT (US); Rahul Chadda, Midvale, UT (US); Suresh Kumar Akella, Midvale, UT (US)

(73) Assignee: Overstock.com, Inc., Midvale, UT (US)

( * ) Notice: Subject to any disclaimer, the term of this patent is extended or adjusted under 35 U.S.C. 154(b) by 64 days.

(21) Appl. No.: 16/859,302

(22) Filed: Apr. 27, 2020

Related U.S. Application Data

(60) Provisional application No. 62/838,989, filed on Apr. 26, 2019.

(51) Int. Cl.
| | |
|---|---|
| *G06Q 20/40* | (2012.01) |
| *G06Q 30/06* | (2012.01) |
| *G06Q 30/00* | (2012.01) |
| *G06Q 20/34* | (2012.01) |
| *G06N 20/00* | (2019.01) |
| *G06Q 40/02* | (2012.01) |

(52) U.S. Cl.
CPC ......... *G06Q 20/4016* (2013.01); *G06N 20/00* (2019.01); *G06Q 20/34* (2013.01); *G06Q 30/0185* (2013.01); *G06Q 30/0609* (2013.01); *G06Q 30/0635* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |
| 4,808,987 | A | 2/1989 | Takeda et al. |
| 4,823,265 | A | 4/1989 | Nelson |
| 4,854,516 | A | 8/1989 | Yamada |

(Continued)

FOREIGN PATENT DOCUMENTS

| | | |
|---|---|---|
| CA | 2253543 | 3/1997 |
| CA | 2347812 | 5/2000 |

(Continued)

OTHER PUBLICATIONS

Berger et al., Random Multiple-Access Communication and Group Testing, IEEE, 1984. (Year: 1984).*

(Continued)

*Primary Examiner* — Nicholas D Rosen
(74) *Attorney, Agent, or Firm* — Clayton Howarth, P.C.

(57) ABSTRACT

This disclosure relates generally to a system and method for using a machine-learning system to more accurately detect fraudulent use of credit cards on an e-commerce website and block those attempts.

29 Claims, 2 Drawing Sheets

(56) References Cited

U.S. PATENT DOCUMENTS

| | | |
|---|---|---|
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 * | 1/2004 | Chinchar .............. G06Q 10/06 707/655 |
| 6,694,436 B1 | 2/2004 | Audebert |
| 6,701,310 B1 | 3/2004 | Sugiura et al. |
| 6,718,536 B2 | 4/2004 | Dupaquis |

(56) References Cited

U.S. PATENT DOCUMENTS

| | | |
|---|---|---|
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 6,912,505 B2 | 6/2005 | Linden et al. |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,099,891 B2 | 8/2006 | Harris et al. |
| 7,100,111 B1 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis et al. |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,904,348 B2 | 3/2011 | Johnson et al. |
| 7,912,748 B1 | 3/2011 | Rosenberg et al. |
| 7,921,031 B2 | 4/2011 | Crysel et al. |
| 7,941,751 B2 | 5/2011 | Ebert |
| 7,979,340 B2 | 7/2011 | MacDonald Korth et al. |
| 7,983,950 B2 | 7/2011 | De Vita |
| 7,983,963 B2 | 7/2011 | Byrne et al. |
| 8,086,643 B1 | 12/2011 | Tenorio |
| 8,112,303 B2 | 2/2012 | Eglen et al. |
| 8,140,989 B2 | 3/2012 | Cohen et al. |
| 8,166,155 B1 | 4/2012 | Rachmeler et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,312,056 B1 | 11/2012 | Peng et al. |
| 8,326,662 B1 | 12/2012 | Byrne et al. |
| 8,370,269 B2 | 2/2013 | MacDonald-Korth et al. |
| 8,370,435 B1 | 2/2013 | Bonefas et al. |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,545,265 B2 | 10/2013 | Sakamoto et al. |
| 8,577,740 B1 | 11/2013 | Murray et al. |
| 8,583,480 B2 | 11/2013 | Byrne |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 9,047,341 B2 | 6/2015 | Pan |
| 9,047,642 B2 | 6/2015 | Byrne et al. |
| 9,418,365 B2 * | 8/2016 | Groarke ............ G06Q 20/4016 |
| 9,448,692 B1 | 9/2016 | Mierau et al. |
| 9,483,788 B2 | 11/2016 | Martin |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 9,954,879 B1 * | 4/2018 | Sadaghiani ............ G06N 20/00 |
| 10,074,118 B1 | 9/2018 | Johnson et al. |
| 10,102,287 B2 | 10/2018 | Martin |
| 10,210,518 B2 * | 2/2019 | Alnajem ............ G06Q 10/0635 |
| 10,269,081 B1 | 4/2019 | Byrne |
| 10,423,997 B2 | 9/2019 | MacDonald Korth et al. |
| 10,534,845 B2 | 1/2020 | Noursalehi et al. |
| 10,977,654 B2 * | 4/2021 | Kumar .................. G06N 20/00 |
| 11,062,316 B2 * | 7/2021 | Bizarro ................ G06Q 20/34 |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese, III et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007356 A1 | 1/2002 | Rice et al. |
| 2002/0013721 A1 | 1/2002 | Dabbiere et al. |
| 2002/0019763 A1 | 2/2002 | Linden et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1 | 5/2002 | Andersson |
| 2002/0099578 A1 | 7/2002 | Eicher, Jr. et al. |
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter et al. |
| 2002/0120537 A1 | 8/2002 | Morea et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal et al. |
| 2002/0138399 A1 | 9/2002 | Hayes et al. |
| 2002/0147625 A1 | 10/2002 | Kolke, Jr. |
| 2002/0156802 A1 | 10/2002 | Takayama et al. |
| 2002/0161648 A1 | 10/2002 | Mason et al. |
| 2002/0188777 A1 | 12/2002 | Kraft et al. |
| 2002/0194049 A1 | 12/2002 | Boyd |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1 | 2/2003 | Ananian |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |

(56) References Cited

U.S. PATENT DOCUMENTS

| | | |
|---|---|---|
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Hoffman et al. |
| 2003/0083961 A1 | 5/2003 | Bezos et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0097352 A1 | 5/2003 | Gulla et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer et al. |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Pettit et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang et al. |
| 2004/0128320 A1 | 7/2004 | Grove et al. |
| 2004/0143731 A1 | 7/2004 | Audebert et al. |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker et al. |
| 2004/0204991 A1 | 10/2004 | Monahan et al. |
| 2004/0230989 A1 | 11/2004 | Macey et al. |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0015498 A1 | 1/2006 | Sarmiento et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez et al. |
| 2007/0299743 A1 | 12/2007 | Staib et al. |
| 2008/0010678 A1* | 1/2008 | Burdette ............ G06Q 30/0603 726/15 |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty et al. |
| 2008/0313010 A1 | 12/2008 | Jepson et al. |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0037355 A1 | 2/2009 | Brave et al. |
| 2009/0106080 A1 | 4/2009 | Carrier et al. |
| 2009/0106127 A1 | 4/2009 | Purdy et al. |
| 2009/0110181 A1 | 4/2009 | Koenig et al. |
| 2009/0119167 A1 | 5/2009 | Kendall et al. |
| 2009/0157537 A1 | 6/2009 | Miller |
| 2009/0164323 A1 | 6/2009 | Byrne |
| 2009/0182589 A1 | 7/2009 | Kendall et al. |
| 2009/0204848 A1 | 8/2009 | Kube et al. |
| 2009/0222348 A1 | 9/2009 | Ransom et al. |

(56) References Cited

U.S. PATENT DOCUMENTS

| | | |
|---|---|---|
| 2009/0222737 A1 | 9/2009 | Liesche et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh et al. |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen et al. |
| 2010/0145831 A1 | 6/2010 | Esfandiari et al. |
| 2010/0146413 A1 | 6/2010 | Yu |
| 2010/0228617 A1 | 9/2010 | Ransom et al. |
| 2011/0010656 A1 | 1/2011 | Mokotov |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0231424 A1 | 9/2012 | Caiman et al. |
| 2012/0233312 A1 | 9/2012 | Ramakumar et al. |
| 2012/0278388 A1 | 11/2012 | Kleinbart et al. |
| 2012/0284336 A1 | 11/2012 | Schmidt et al. |
| 2013/0031470 A1 | 1/2013 | Daly, Jr. et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg et al. |
| 2013/0185164 A1 | 7/2013 | Pottjegort |
| 2013/0191409 A1 | 7/2013 | Zeng et al. |
| 2013/0254059 A1 | 9/2013 | Teo |
| 2013/0268561 A1 | 10/2013 | Christie et al. |
| 2014/0019313 A1 | 1/2014 | Hu et al. |
| 2014/0025509 A1 | 1/2014 | Reisz et al. |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0180758 A1 | 6/2014 | Agarwal et al. |
| 2014/0200959 A1 | 7/2014 | Sarb et al. |
| 2014/0259056 A1 | 9/2014 | Grusd |
| 2014/0289005 A1 | 9/2014 | Laing et al. |
| 2014/0337090 A1 | 11/2014 | Tavares |
| 2014/0372415 A1 | 12/2014 | Fernandez-Ruiz |
| 2015/0019958 A1 | 1/2015 | Ying et al. |
| 2015/0286742 A1 | 10/2015 | Zhang et al. |
| 2015/0287066 A1 | 10/2015 | Wortley et al. |
| 2016/0071105 A1* | 3/2016 | Groarke ............... G06Q 20/384 705/44 |
| 2017/0300911 A1* | 10/2017 | Alnajem ............ G06Q 10/0635 |
| 2017/0344622 A1 | 11/2017 | Islam et al. |
| 2018/0167412 A1* | 6/2018 | Barrett ................ H04L 63/1408 |
| 2019/0066111 A1* | 2/2019 | Bizarro .............. G06Q 20/4016 |
| 2019/0295088 A1* | 9/2019 | Jia ....................... G06Q 20/4016 |
| 2020/0005310 A1* | 1/2020 | Kumar ............... G06Q 20/4016 |
| 2020/0065357 A1 | 2/2020 | Noursalehi et al. |
| 2020/0250675 A1* | 8/2020 | Hanis ..................... G06N 20/00 |

FOREIGN PATENT DOCUMENTS

| | | |
|---|---|---|
| EP | 0636993 | 4/1999 |
| EP | 0807891 | 5/2000 |
| EP | 1241603 | 9/2002 |
| GB | 2397400 | 1/2003 |
| GB | 2424098 | 9/2006 |
| JP | 2001283083 | 12/2001 |
| JP | 2002318935 | 10/2002 |
| JP | 2007021920 | 2/2007 |
| JP | 2009505238 | 2/2009 |
| WO | WO9717663 | 5/1997 |
| WO | WO9959283 | 5/1998 |
| WO | WO9832289 | 7/1998 |
| WO | WO9847082 | 10/1998 |
| WO | WO9849641 | 11/1998 |
| WO | WO0025218 | 5/2000 |
| WO | WO0109803 | 2/2001 |
| WO | WO0182135 | 11/2001 |
| WO | WO0197099 | 12/2001 |
| WO | WO0237234 | 5/2002 |
| WO | WO03094080 | 11/2003 |
| WO | WO2007021920 | 2/2007 |
| WO | WO2012093410 | 7/2012 |
| WO | WO2015116038 | 8/2015 |
| WO | WO2015176071 | 11/2015 |

OTHER PUBLICATIONS

Clemons et al., "Evaluating the prospects for alternative electronic securities markets," Proceedings of the Twelfth International Conference on Information Systems, New York, New York, United Sates, pp. 53-61. (Year: 1991).*

Kuula, "Telematic Services in Finland," Electronic Markets—The International Journal, Oct. 1993, 2 pages, vol. 3, No. 3. (Year: 1993).*

"ONSALE joins fray as online shopping picks up speed: Internet Booms," Computer Reseller News, Jun. 5, 1995. (Year: 1995).*

Dubinsky, B., "Uncovering accounts payable fraud by using 'fuzzy matching logic': Part 1," Business Credit 110.3: 6 (4), National Association of Credit Management, Mar. 2008. (Year: 2008).*

Dubinsky, B., "Uncovering accounts payable fraud by using 'fuzzy matching logic': Part 2," Business Credit 110.4: 64(3), National Association of Credit Management, Apr. 2008. (Year: 2008).*

Fan, J., Keim, F.A., Gao, Y., Luo, H., and Li, Z. (2009). JustClick: Personalized Image Recommendation via Exploratory Search from Large-Scale Flickr Images. Feb. 2009. IEEE Transactions on Circuits and Systems for Video Technology, 19(2), pp. 273-288. (Year: 2009).*

2Roam, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 1, No. 3.

Anonymous, Image manipulation (image-editing software and image-manipulation systems)(Seybold Special Report, Part II), Seybold Report on Publishing Systems, May 15, 1995, p. S35(9), vol. 24, No. 18.

auctionwatch.com, multiple pages—including search results for "expedition," printed Apr. 21, 2011.

auctiva.com, multiple pages, undated but website copyright date is "1999-2000."

Ball et al., "Supply chain infrastructures: system integration and information sharing," ACM SIGMOD Record, 2002, vol. 31, No. 1, pp. 61-66.

(56) References Cited

OTHER PUBLICATIONS

Braganza, "IS Resarch at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page. Vol. 3, No. 3.
Business Wire business/technology editors, "Sellers Flock to OutletZoo. com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web: Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Chen, M. (2007). Knowledge assisted data management and retrieval in multimedia database systems (Order No. 3268643).
Y.K. Choi and S. K. Kim, "An auxiliary reccomendation system for repetitively purchasing items in E-commerce," 2014 International Conference on Big Data and Smart Computing (BIGCOMP), Bangkok, 2014, pp. 96-98. (Year 2014).
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1993, 4 pages, vol. 8, No. 2.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
Icrossing, "Icrossing Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2a.
Ives et al., "Editor's Comments—MISQ Central: Creating a New Intellectual Infrastructure," MIS Quarterly, Sep. 1994, p. xxxv.
Joshi, "Information visibility and its effect on supply chain dynamics," Ph.D. dissertation, Massachusetts Institute of Technology, 2000 (fig. 4.5; p. 45).

Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
S. Kulkarni, A. M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Lee, "AUCNET: Electronic Intermediary for Used-Car Transactions," Electronic Market—The International Journal, Dec. 1997, pp. 24-28, vol. 7, No. 4.
T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).
Levy, Michael, and Dhruv Grewal. "Supply chain management in a networked economy." Journal Retailing 76.4 (2000): 415-429.
Live365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinnity, "Build Your Weapon," PC Magazine, Apr. 24, 2011, printed from www.pcmag.com/print_article2?0,1217, a%253D3955,00. asp.
Meade, "Visual 360: a performance appraisal system that's 'fun,'" HR Magazine, 44, 7, 118(3), Jul. 1999.
"Mediappraise: Mediappraise Receives National Award for Web-Based Technology That Enables Companies to Solve Thomy HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "FAST—A Research Project in Electronic Commerce," Electronic Markets—The International Journal, Oct. 1993, 4 pages, vol. 3., No. 3.
Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.

(56) References Cited

OTHER PUBLICATIONS

Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.

"Onsale: Onsale Brings Thrill of Auctions and Bargain Hunting Online: Unique Internet retail services debuts with week-long charity auction for The Computer Museum in Boston," May 24, 1995, printed from www.dialogweb.com/cgi/dwclient?dwcommand,DWEBPRINT%20810-489267.

Palm, Inc., PalmTM Web Pro Handbook, copyright 2002-2003.

Post et al., "Application of Auctions as a Pricing Mechanism for the Interchange of Electric Power," IEEE Transactions of Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http://www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252, vol. 21.

Reck, "Trading-Process Characteristics of Electronic Auctions," Electronic Markets—The International Journal, Dec. 1997, pp. 17-23, vol. 7, No. 4.

repcheck.com, www.repcheck.com homepage, printed from web.archive.org/web/20020330183132/http://repcheck.com on Sep. 5, 2009.

Resnick et al., "Reputation Systems," Communications of the ACM, Dec. 2000, pp. 45-48, vol. 43, No. 12.

Rockoff et al., "Design of an Internet-based system for remote Dutch auctions," Internet Research: Electronic Networking Applications and Policy, 1995, pp. 10-16, vol. 5, No. 4.

Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).

Rose, "Vendors strive to undo Adobe lock-hold," Computer Reseller News, Feb. 5, 1996, n 66669, p. 71(7).

Ross, David Frederick, Frederick S. Weston, and W. Stephen. Introduction to supply chain management technologies. CRC Press, 2010.

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).

Schmid, "Electronic Markets," Electronic Markets—The International Journal, Oct. 1993, 2 pages, vol. 3, No. 3.

Schwankert, "Matsushita Taps 2Roam for Wireless Solutions," www.internetnews.com/bus-news.article.php/674811, Feb. 2, 2001.

Sen, "Inventory and Pricing Models for Perishable Products," Doctor of Philosophy Dissertation—University of Southern California, Aug. 2000.

Siegmann, "Nowhere to go but up," PC Week, Oct. 23, 1995, 3 pages, vol. 12, No. 42.

Telephony Staff, "Air-ASP," Telephony Online, Oct. 2, 2000, 3 pages.

Teo, "Organizational Factors of Success in Using EDIS: A Survey of Tradenet Participants," Electronic Markets—The International Journal, Oct. 1993, 2 pages, vol. 3, No. 3.

Tjostheim et al., "A case study of an on-line auction for the World Wide Web," printed from www.nr.no/gem/elcom/puplikasjoner/enter98e.html on Jun. 10, 1990, 10 pages.

Turban, "Auctions and Bidding on the Internet: An Assessment," Electronic Markets—The International Journal, Dec. 1997, 5 pages, vol. 7, No. 4.

ubid.com, "How do I Updated my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

ubid.com, "Can I track all of my bids from My Page?" printed from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNewswire, Sep. 23, 2002.

Warbelow et al., "AUCNET: TV Auction Network System," Harvard Business School 9-190-001, Jul. 19, 1989, Rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

xchanger.net, webpage printed from www.auctiva.com/showcases/as_4sale.asp?uid=exchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

Message Passing from Wikipedia, archived May 6, 2016, retrieved from https://en.wikipedia.org/wiki/message_passing, 4 pages.

Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).

Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).

\* cited by examiner

SYSTEM, METHOD, AND PROGRAM PRODUCT FOR RECOGNIZING AND REJECTING FRAUDULENT PURCHASE ATTEMPTS IN E-COMMERCE

CROSS-REFERENCE TO RELATED APPLICATIONS

This application claims the benefit of U.S. Provisional Application No. 62/838,989, filed Apr. 26, 2019, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH AND DEVELOPMENT

Not Applicable.

BACKGROUND

This disclosure relates generally to a system, method, and program product, for recognizing attempts to fraudulently verify credit card details and mitigating those attacks without causing unnecessary impacts to existing customers and business.

Big e-commerce companies face attacks every day in many different ways. Having a website that is open to the Internet and accepting payments over the Internet make e-commerce companies a prime target for credit card fraud. One vector of attack is based on credit card verification attacks to guess partial credit card details. This type of fraud comprises using a credit card a number of times on a website, or over multiple websites, to discover through trial-and-error details such as whether a credit card is valid, expiration date, CCV/CVV/CVV2 (card verification value) code, and other details needed to fraudulently use a credit card number, cancelling the order each time, to discover if the credit card is valid and find out specific details such as the expiration date and CCV/CVV/CVV2 number. Many websites limit the number of failed attempts that a single customer could make with a card, however many programs would not detect multiple attempts coming from different customer accounts or different IP addresses. As such, some attackers may distribute their attacks over multiple customer accounts and multiple IP addresses to avoid the software that flags a card used for multiple attempts at guessing the information. These attacks are often carried out using automated programs, so a variety of methods of detecting automated programs have evolved, but these methods can impact the customer experience, and may not prevent all distributed verification attacks. In addition, attack methods are constantly evolving, using different methods to hide a distributed verification attack from the software designed to prevent it.

What is needed is a method to mitigate against distributed credit card verification attacks spread out across different IP addresses using multiple customer accounts, while ensuring that existing regular customer traffic is not impacted. The ideal solution would be implemented by credit card companies and/or at the payment network layer, as only these groups have the ability to see multiple attempts for the same credit card that are distributed over various different web sites. However, solutions for individual companies are needed to help e-commerce companies mitigate the risk of accepting credit cards online and to help prevent distributed verification attacks from using these websites. The instant invention focuses on individual websites, being designed to prevent distributed verification attacks on a single website while ensuring that existing regular customer traffic is not impacted, and also being designed to take into account different factors and improve the outcomes over time.

The features and advantages of the disclosure will be set forth in the description that follows, and in part will be apparent from the description, or may be learned by the practice of the disclosure without undue experimentation. The features and advantages of the disclosure may be realized and obtained by means of the instruments and combinations particularly pointed out herein.

SUMMARY OF THE DISCLOSURE

A purpose of the instant disclosure is to prevent distributed verification attacks on credit cards from using an e-commerce website to obtain details about a credit card, while ensuring that regular customer traffic on the e-commerce website is not impacted. The goal is to prevent malicious users from placing orders, even if those attacks are coming from multiple different IP addresses and multiple customer accounts. Traditional fraud detection systems look at the number of orders per customer account, thus allowing those using multiple accounts to get around them. The system allows an automated method to be put into the website that can correlate IP addresses, customer identifications, and other data points that allows or denies access and employs machine learning protocols to continuously improve the system while not impacting genuine orders from customers.

DETAILED DESCRIPTION

Figure 1:
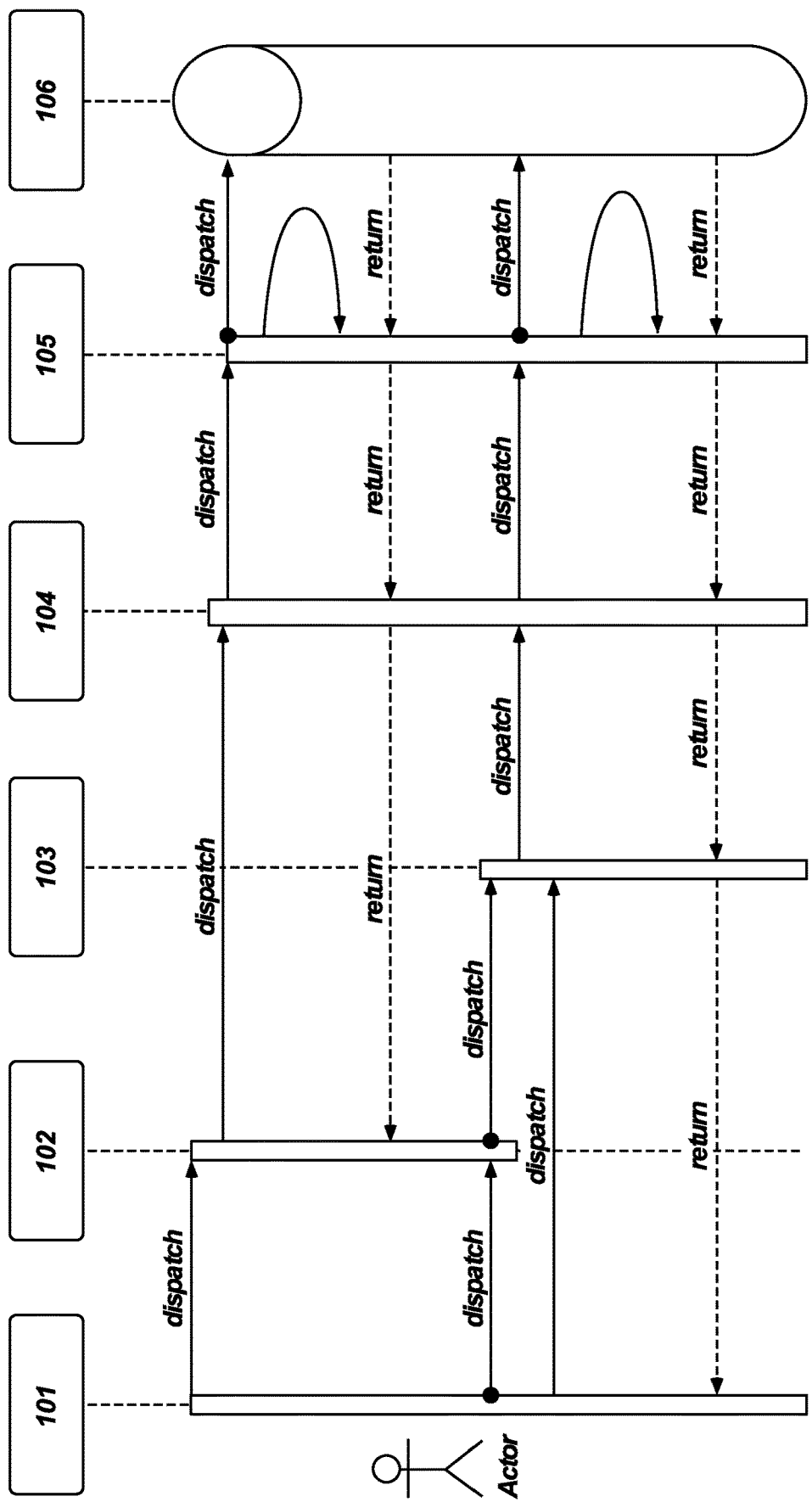
FIG. 1 is a chart showing the general system of an e-commerce website with the location of the instant invention as a filtering service.

For the purposes of promoting an understanding of the principles in accordance with this disclosure, reference will now be made to illustrative embodiments of the invention. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the devices, systems, processes, and methods will be disclosed and described, it is to be understood that this disclosure is not limited to the particular configurations, process steps, and materials disclosed herein, as such configurations, process steps, and materials may vary somewhat. It is also to be understood that the terminology employed herein is used for the purpose of describing particular illustrative embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a", "an", and "the" include plural referents unless the context clearly dictates otherwise.

As used herein, the terms "comprising," "including," "containing," "characterized by," "having" and grammatical equivalents thereof are inclusive or open-ended terms that do not exclude additional, unrecited elements or method steps.

As used herein, a "bot" (short for "robot") is an automated program that runs over the Internet. As is known in the art, some bots run automatically, while others only execute commands when they receive specific input. See https://techterms.com/definition/bot. As used herein, "artificial intelligence" or "AI" is the ability of a computer to act like a human being and/or a program designed to do so. See https://techterms.com/definition/artificial intelligence.

The following computer systems and elements refer to systems used in the ideal embodiment of the invention described below. The invention described below is not limited to the use of the specific elements below, but as will be apparent to those skilled in the art, any similar program or platform which is equivalent may be used to effect the invention described. Nevertheless, in the interest of disclosing the preferred embodiment, specific systems will be disclosed.

As used herein, "Amazon RDS" refers to Amazon Relational Database Service, a platform used to set up, operate, and scale a relational database in the cloud. It provides cost-efficient and resizable capacity while automating time-consuming administration tasks such as hardware provisioning, database setup, patching and backups (Amazon Relational Database Service (RDS), 2018).

As used herein, "Redis" refers to an open source (BSD licensed), in-memory data structure store, used as a database, cache and message broker that has built-in replication, Lua scripting, LRU eviction, transactions and different levels of on-disk persistence, and provides high availability and automatic partitioning. (Redis, 2018)

As used herein, "Amazon ElastiCache" refers to Amazon ElastiCache for Redis, a fast, in-memory data store built an open source Redis that provides sub-millisecond latency to power internet-scale real-time applications. (Amazon ElastiCache for Redis, 2018)

As used herein, "Apache Hadoop" refers to the Apache Hadoop software library, a framework that allows for the distributed processing of large data sets across clusters of computers using simple programming models (Apache Hadoop, 2018).

As used herein, "Apache Kafka" refers to a distributed streaming platform used for building realtime streaming data pipelines that reliably get data between systems or applications and transform or react to the streams of data (Apache Kafka, 2018).

As used herein "storm cluster" refers to a cluster created using Apache Storm.

A system, method, and program product for detecting and preventing distributed verification attacks from using an e-commerce website is presented. The system prevents malicious users from placing orders on the website while allowing normal customer traffic to be unaffected. The system improves upon existing systems by detecting and preventing malicious users from using the website even when those malicious users utilize several different IP addresses and spread their use across several different customer accounts. It does this by creating an automated system that is built into an e-commerce website that correlates orders by IP address, customer ID, and other data points to allow or deny an order made on an e-commerce website. The method described is used to implement the solution in any number of websites that allow a customer to make a purchase via credit card.

One illustrative embodiment of the current invention creates an application designed to include detection of credit card verification attacks even though they may be coming in from a distributed range of IP addresses and are spread out over multiple customer accounts for an e-commerce website; identify patterns of attacks to be able to track new attempts as the attackers evolve their tactics in response to the mitigation strategies the company implements; not impact existing customer traffic; build out logic in the software application (website) to ensure only malicious users are blocked and genuine traffic is allowed without any issues; and monitor and tune the application logic over time to evolve with the changing tactics of those attempting fraud.

A system for preventing distributed verification attacks comprises a non-transitory computer readable medium containing instructions that can be integrated into an existing e-commerce website. The system may comprise a series of instructions in a non-transitory computer-readable medium. The set of instructions contained in the computer readable medium require any request to purchase from the website to be verified as not fraudulent. The instructions to complete this verification process may be stored in a computer readable medium in the form of an independent, named application, which is stored in the computer readable medium and which is run any time a user attempts to check out. In one embodiment this named fraud filtering application is called FraudFilteringService. In one embodiment this application may generate either a "blocked" or "not-blocked" response whenever it is called in response to an attempt to make a purchase. The system only allows an attempt to make a purchase if a "not-blocked" response is generated, showing that the purchaser is verified.

The independent application, FraudFilteringService, determines whether the request to make a purchase is blocked or not by using certain logic and criteria to determine whether a check-out request is likely to be fraudulent and therefore should be blocked. The logic the application uses to make this determination may include a number of factors, each of which may have a different weight. For example, this logic can include a determination based on Customer account ID, IP address, transaction amount, shipping address, products in carts, browser user agent, browser language settings, HTTP referrer, the total time spent on the website, the Frequency of the visit, the Ratio of successful orders to attempts, or the number of pages visited on the website before checkout. These factors can have different weights assigned to them and can be updated and modified through a machine learning program.

As seen in FIG. 1, the request to purchase originates in the customer's browser 101 and is sent from the customer's browser to the website 102 in part and in part is through the API-Gateway 103 of the system. In one embodiment, customer traffic is directed to an e-commerce website and is rendered by the website application 102. Subsequent calls to the website can be handled by the API-Gateway application 103, which routes requests to the required back end API interface. For example, the first request to load the checkout page goes to the website 102. However, once the page is loaded, subsequent calls, such as filling in a billing or shipping address go to the API-Gateway app 103 to be routed to the proper API interface (such as the Shipping API interface, or the AddressAPI interface) (not shown). Users of the website (whether legitimate customers or attackers), however, access only the API-Gateway application 103 and the website application 102. These are the points in the system that are connected to the filtering service 104. In addition to the filtering service 104, a cache 105 and database 106 are established.

In one illustrative embodiment the filtering service 104 takes the form of an application called "FraudFilteringService." This application is created as a RESTful webservice to check the validity of requests coming in from the e-commerce website and the API gateway for checkout. The business logic for the accepting or rejecting the checkout request resides in this application. The filtering service evaluates if the incoming request should be blocked or not based on the data points coming in, the current business logic, and the data written previously by this application in the database. To cut down the number of calls to the database and make the solution performant, short-term caching mechanisms are implemented. This ensures that the requests are near-real-time while making sure the solution is performant.

In one illustrative embodiment, a new programming cluster is created based on Apache Kafka or a similar program to ingest the checkout requests from the website and API-Gateway, and also the final fraud decision taken for the respective checkout request. This information is stored and used in later machine-learning systems to improve the quality of the system.

In one embodiment, when a user wants to complete a purchase on an e-commerce website, the instructions in the computer readable media cause a request to be sent to the Filtering Service 104. This service sends a request to a memory data structure cache 105, which has a time to live of 2 minutes, for example. If data are not found in the cache 105, a further call is made to the database 106, and the data are then stored in the cache 105 for two minutes, for example. The cache 105 is established using a fast, in-memory data store that can provide sub-millisecond latency able to power Internet-scale real-time applications, such as Amazon ElastiCache or similar systems. The database 106 is set up as a relational database in the cloud, which can be done using Amazon RDS or a similar program.

The filtering service incorporates logic for preventing access to the website by users deemed to be performing distributed verification attacks. The system can incorporate a number of relevant criteria when analyzing a request. Some of the criteria that can help the system determine whether a distributed verification attack is taking place include the number of previous attempts to check out, the customer account ID that is checking out, the IP address from which the check out takes place, transaction amount, shipping address, what products are in the carts, the browser user agent, the browser language settings, the HTTP referrer, the total time spent on the website, the frequency of the visits to the website, the ratio of successful orders to attempts, and the number of pages visited before checkout on the website. These are examples; additional factors could be imagined that might be useful, such as credit card number or other factors. The filtering service analyzes the factors, as noted below, and then responds to the request with a "blocked" or "not-blocked" response based on the logic and the various factors that are indicative of possible fraud.

In one embodiment of the invention, when the filtering service determines that a request should be blocked, it may respond with an HTTP code 400 response (Bad Request). Another embodiment allows the filtering service to respond with an HTTP code 503 response (Internal Server Error).

Each of the relevant criteria may be given a different weight by the filtering service 104, or even no weight at all. For example, in one embodiment of the system, the system may consider only the number of previous attempts to check out, based on either the customer or the credit card number. However, another embodiment might incorporate the customer account ID and the IP address from which the purchase takes place, with appropriate weight given to each factor. The system may also incorporate machine learning processes to change the weight of each factor. As such, it will be understood that in a particular system, the specific weight given to each factor may vary with both time and with the specific website using the program. This enables the program to better respond to fraud and tailor the approach to the specific needs of the particular website on which it is being used.

Figure 2:
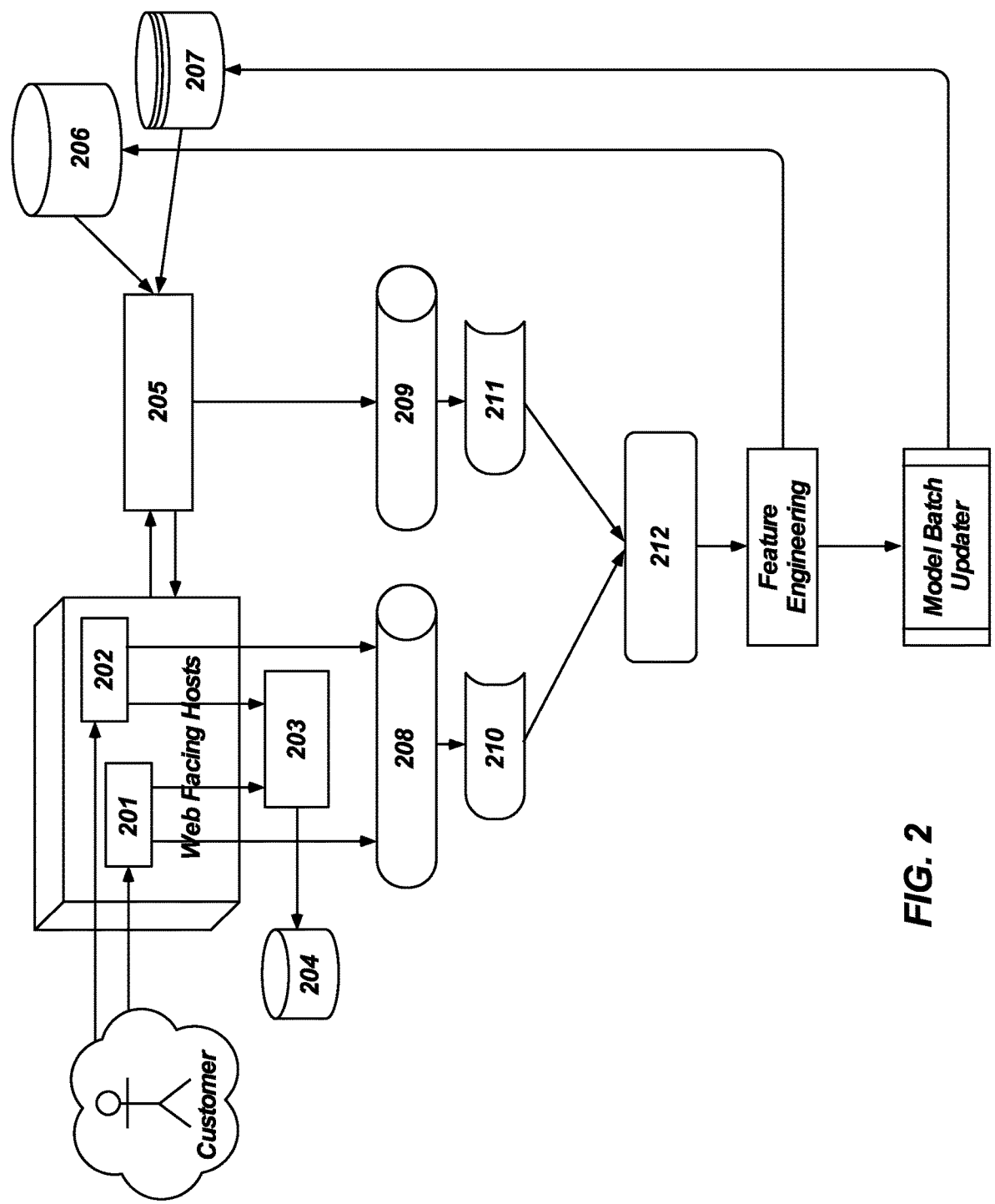
FIG. 2 is a diagram showing the machine learning feedback process of the fraud detection system.

FIG. 2 shows an embodiment of the system in an e-commerce environment, including a machine-learning program that adjusts the weight of each factor to determine whether to block a particular request. In this embodiment, a checkout request is made by a customer, which goes through the website and the website's API gateway 201 and 202. At the time of the request, the system calls a Checkout Action Aggregator service 203. This service is responsible for fetching aggregated data in context to the existing checkout request by referring to the available historical data stored in the database 204. The data collected are used to enrich the request data.

At the same time, the Fraud filtering service is called 205, which obtains necessary features from a Feature Store 206 for machine learning and a predicted probability score for checkout is obtained using a Model Store 207. The Fraud filtering service 205 then uses the information to create a response from the request parameters, features used, and the allowed or blocked decision, which is stored in fraud-decision-topic 209. In one illustrative embodiment the filtering service publishes the exact request parameters, features used, and response provided to fraud-decision-topic. In one embodiment, fraud-decision-topic is a Kafka topic created using Apache Kafka or similar system. Meanwhile, request logs from Website/API-gateway are channeled through the checkout requests 208 and create a log entry 210 on another Kafka topic, checkout-request-topic, which obtains request logs from the website and API gateway 201 and 202. This log entry 210 on checkout-request-topic is correlated with a log entry on fraud-decision-topic 211 using a unique UUID (universally unique identifier) generated for every request 212. Joining the logs gives the entire context of the checkout request, as well as the features used and decision taken for the checkout request.

The logs are then cleaned for invalid data, imputed for missing data, and normalized where needed. This is done using a framework that can perform fast distributed computing and allows programs to load data and query the data repeatedly, such as Apache Spark or a similar platform. These data can be used for training a machine learning model, which can be evaluated to ensure that it is performing accurately. When the model is above a threshold accuracy, it is stored in object storage and is used in the Model Store 207 for future predictions and decisions, and is then further refined by the continuing process.

In one embodiment, access logs from the website and API-Gateway are channeled through an Apache Kafka cluster are sent to a Storm cluster and the output is fed back to the Filtering Service and written to the database. This information is leveraged for all subsequent attempts and this will be the basis for the initial Machine Learning algorithm. Based on how the malicious traffic changes, the logic in the Storm cluster will be updated. A whitefish section can be provided to whitefish any customer ID in case they are wrongfully blocked.

In addition to recording and analyzing traffic patterns over time, as well as recording blocks by the fraud filtering service, the system uses machine learning logic to update and refine the fraud filtering service. In addition to the blocks made, manual corrections for given situations can be included in the machine learning process. For example, another point in the service creates a "whitefish" in the fraud filtering service to allow access by any customers who are wrongfully blocked and allows those users to make purchases on the website. The machine-learning elements of the system can be used to update and refine the systems for blocking distributed verification attacks as attackers incorporate different methods to conceal distributed verification attacks from detection software. The whitefish can be added to manually when it is determined that an order was blocked by mistake and can be used in the machine-learning process to train the system and to improve the accuracy of the filtering service 205.

In one illustrative embodiment, machine learning applications ensure that traffic patterns are recorded and analyzed over time to make the FraudFilteringService more accurate. In addition, the Checkout Action Aggregator service is responsible for fetching the aggregated data in context to the existing checkout request by referring to the available historical data.

In one illustrative embodiment, the system is implemented using AWS-EC2 cloud service and the following resources on the AWS cloud:
  EBS Volumes for Customer Data: 4 SSD volumes with storage of 300 GB per volume, operating at 900 IOPS and having baseline throughput of 160 MBs/sec.
  Application Servers: 2 instances running Linux on m5d.2xlarge
  Web Servers: 2 instances running Linux on m5d.2xlarge
  Database Servers: 2 instances running Linux on m5d.2xlarge In this embodiment, each of the above m5d.2xlarge servers will have the following configuration: 8 vCPUs, 32 GiB Memory, 1×300 NVMe SSD drive with an I/O of up to 10 Gbps. In one illustrative embodiment, the setup includes 10 Elastic IPs per month and will have incoming data transfer limit of 20 GB/week coming in and outgoing data transfer limit of 20 GB/month. The data are backed up and stored to help with future machine learning projects.

In one illustrative embodiment, the e-commerce website and the API-Gateway run on Java. In this embodiment, the FraudFilteringService program also runs on Java and connects to the machine learning components. The preferred embodiment uses Amazon RDS as the backend relational database to store all the data from the various transactions. The cache is implemented using Amazon ElastiCache for Redis instance. The Cache may have a time to live of 2 minutes, for example, to cut down on the database calls. This time to live may be adjusted upward or downward as may be better suited for the operation of the system in a certain environment. For example, a cache with a time to live of 5 minutes, 4 minutes, 3 minutes, or one minute, or another selected time, may be instituted. Or a cache with longer or shorter term time to live may be instituted. The cache ensures that the application remains performant even when a new call is introduced for each checkout request from the e-commerce website.

What is claimed is:

1. A system for detecting and preventing distributed verification attacks on an e-commerce website, comprising:
  an e-commerce computer configured for connecting to a purchaser computer through the Internet;
  a non-transitory computer readable medium containing a series of fraud-detection instructions that cause a website to:
    determine when a user is attempting to make a purchase;
    compare data about the user to a series of factors relevant to whether the purchase attempt is fraudulent;
    record the factors used to determine whether an attempt is fraudulent;
  a server connected to the Internet, wherein the server contains programming directing the system to execute the fraud-detection instructions each time a user attempts to make a purchase; and
  at least one machine learning algorithm for training the fraud detection system and adjusting the factors used to determine whether a distributed verification attack is taking place.

2. The system of claim 1 wherein the factors used to determine whether a purchase attempt is fraudulent include information on a number of previous attempts made.

3. The system of claim 1 wherein the factors used to determine whether a purchase attempt is fraudulent include a Customer account ID.

4. The system of claim 1 wherein the factors used to determine whether a purchase attempt is fraudulent include an IP address.

5. The system of claim 1 wherein the factors used to determine whether a purchase attempt is fraudulent include an amount of the transaction.

6. The system of claim 1 wherein the factors used to determine whether a purchase attempt is fraudulent include a shipping address.

7. The system of claim 1 wherein the factors used to determine whether a purchase attempt is fraudulent include products in carts.

8. The system of claim 1 wherein the factors used to determine whether a purchase attempt is fraudulent include a Browser user agent.

9. The system of claim 1 wherein the factors used to determine whether a purchase attempt is fraudulent include Browser language settings.

10. The system of claim 1 wherein the factors used to determine whether a purchase attempt is fraudulent include an HTTP referrer.

11. The system of claim 1 wherein the factors used to determine whether a purchase attempt is fraudulent include total time spent on the website.

12. The system of claim 1 wherein the factors used to determine whether a purchase attempt is fraudulent include frequency of visits to the website.

13. The system of claim 1 wherein the factors used to determine whether a purchase attempt is fraudulent include a ratio of successful orders to attempted orders.

14. The system of claim 1 wherein the factors used to determine whether a purchase attempt is fraudulent include a number of pages visited by the user before checkout.

15. The system of claim 1 also comprising a Checkout Action Aggregator that obtains data in context to an existing checkout request by referring to available historical data.

16. A method of detecting and preventing distributed verification attacks on an e-commerce website comprising a fraud filtering program, comprising:
- storing available historical data about customers and their purchases in a historical database;
- comparing data stored in the historical database about a user attempting to complete a purchase on a website to a series of factors relevant to whether the purchase attempt is fraudulent;
- using the data stored and the factors relevant to whether the purchase attempt is fraudulent to determine whether the purchase attempt is fraudulent;
- recording the factors used to determine whether an attempt is fraudulent;
- preventing the purchase from being completed if the attempt is deemed to be fraudulent;
- using the recorded factors to train a system through machine-learning to better stop fraudulent attempts to use credit cards; and
- incorporating the newly trained system into the fraud filtering program and adjusting weights of the factors to determine whether an attempt is fraudulent.

17. The method of claim 16 wherein the factors used to determine whether a purchase attempt is fraudulent include information on a number of previous attempts made.

18. The method of claim 16 wherein the factors used to determine whether a purchase attempt is fraudulent include a Customer account ID.

19. The method of claim 16 wherein the factors used to determine whether a purchase attempt is fraudulent include an IP address.

20. The method of claim 16 wherein the factors used to determine whether a purchase attempt is fraudulent include an amount of the transaction.

21. The method of claim 16 wherein the factors used to determine whether a purchase attempt is fraudulent include a shipping address.

22. The method of claim 16 wherein the factors used to determine whether a purchase attempt is fraudulent include products in carts.

23. The method of claim 16 wherein the factors used to determine whether a purchase attempt is fraudulent include a Browser user agent.

24. The method of claim 16 wherein the factors used to determine whether a purchase attempt is fraudulent include Browser language settings.

25. The method of claim 16 wherein the factors used to determine whether a purchase attempt is fraudulent include an HTTP referrer.

26. The method of claim 16 wherein the factors used to determine whether a purchase attempt is fraudulent include total time spent on the website.

27. The method of claim 16 wherein the factors used to determine whether a purchase attempt is fraudulent include frequency of visits to the website.

28. The method of claim 16 wherein the factors used to determine whether a purchase attempt is fraudulent include a ratio of successful orders to attempted orders.

29. The method of claim 16 wherein the factors used to determine whether a purchase attempt is fraudulent include the number of pages visited by the user before checkout.

* * * * *